July 22, 1924.
C. F. BALL
1,502,009
NONSKID CHAIN ATTACHMENT FOR MOTOR VEHICLES
Filed Feb. 4, 1920    3 Sheets-Sheet 1
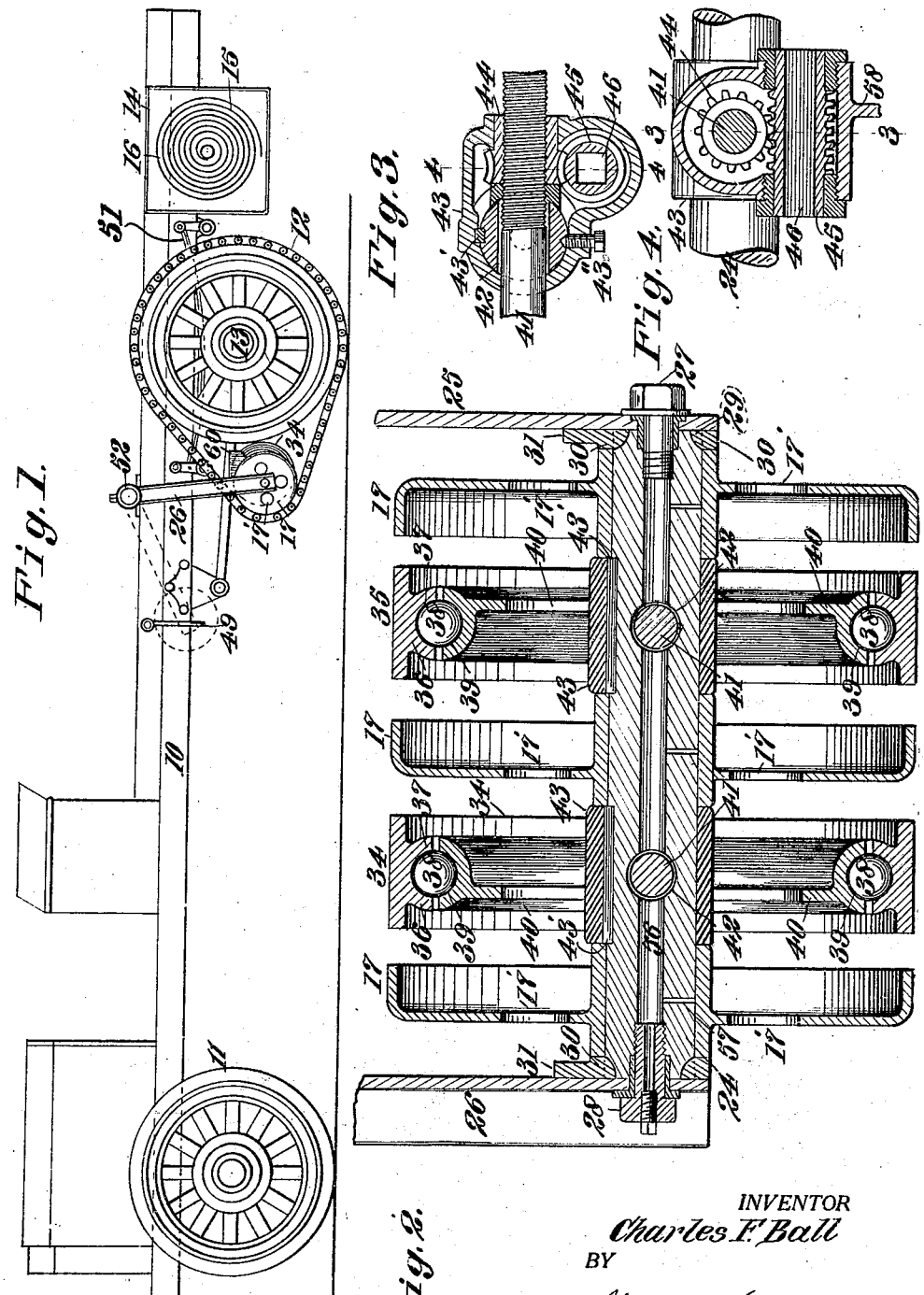
INVENTOR
Charles F. Ball
BY
Strong & Townsend
ATTORNEYS

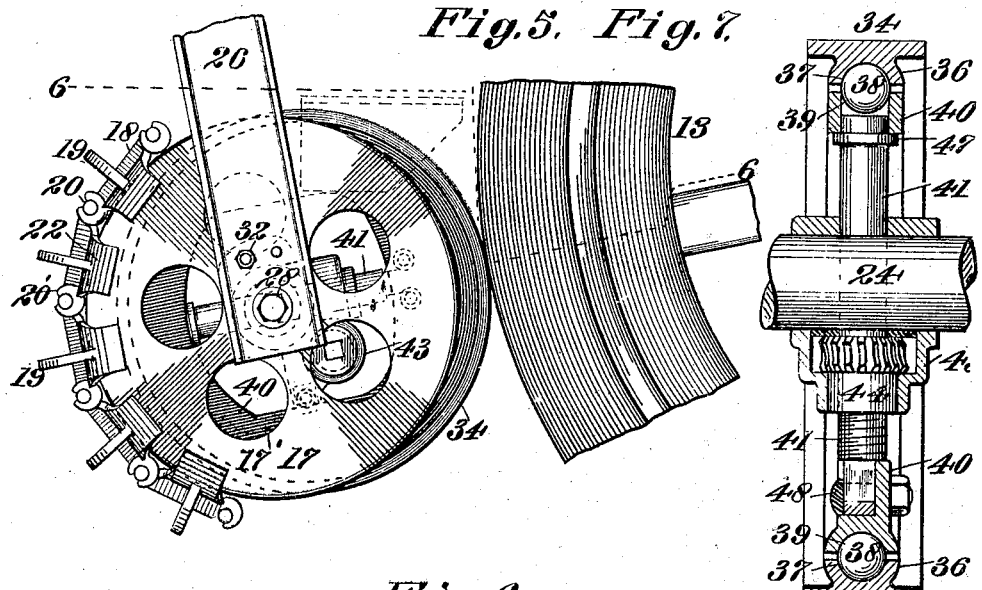

July 22, 1924.
C. F. BALL
1,502,009
NONSKID CHAIN ATTACHMENT FOR MOTOR VEHICLES
Filed Feb. 4, 1920   3 Sheets-Sheet 3
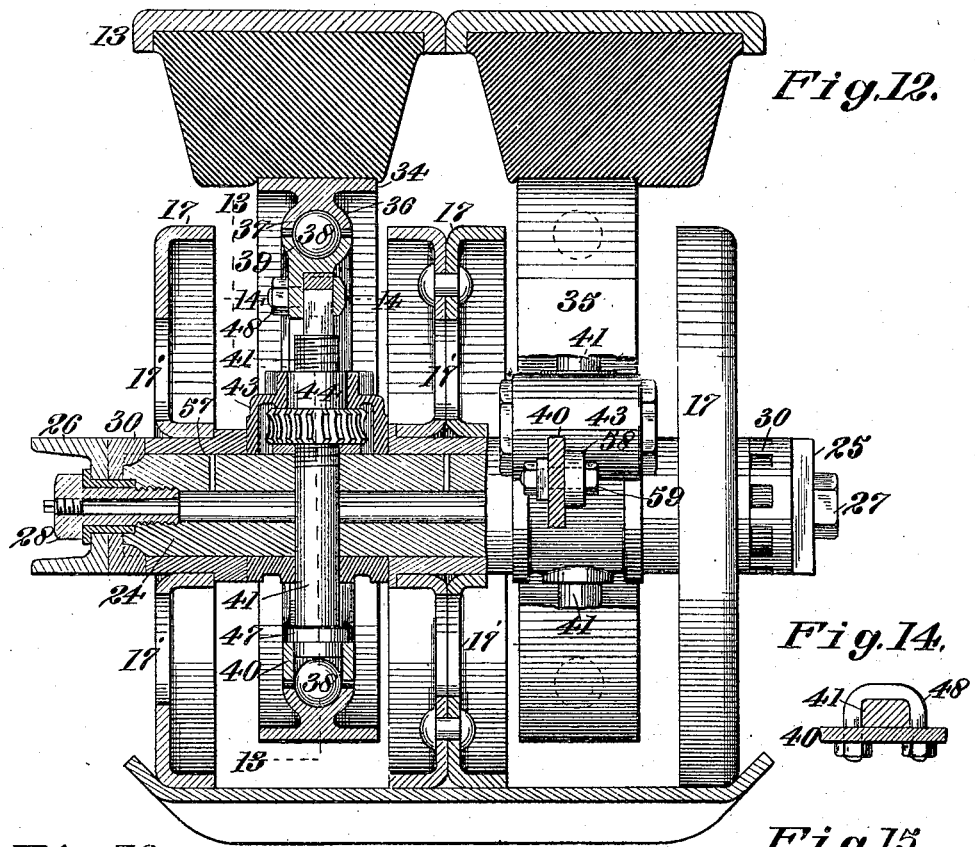
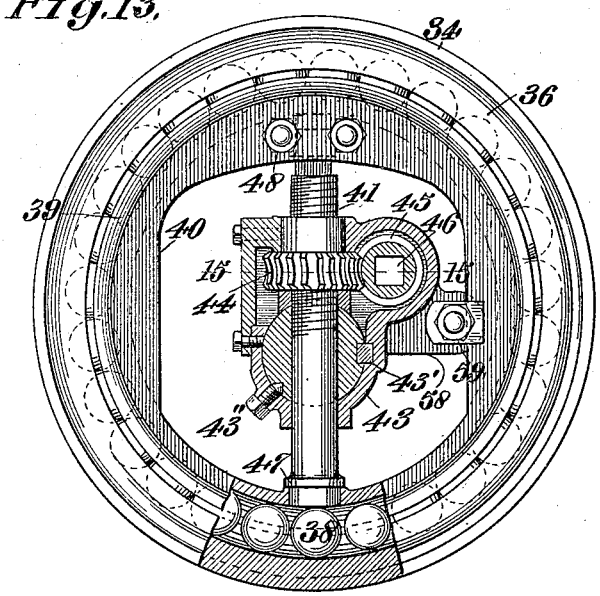
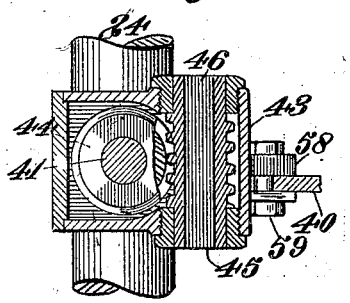
INVENTOR
*Charles F. Ball*
BY
*Strong & Townsend*
ATTORNEYS Patented July 22, 1924.

1,502,009

UNITED STATES PATENT OFFICE.

CHARLES F. BALL, OF PEORIA, ILLINOIS, ASSIGNOR TO RESEARCH CORPORATION, OF NEW YORK, N. Y., A CORPORATION OF NEW YORK.

NONSKID CHAIN ATTACHMENT FOR MOTOR VEHICLES.

Application filed February 4, 1920. Serial No. 356,168.

*To all whom it may concern:*

Be it known that I, CHARLES F. BALL, a citizen of the United States, residing at Peoria, in the county of Peoria and State of Illinois, have invented new and useful Improvements in Nonskid Chain Attachments for Motor Vehicles, of which the following is a specification.

This invention relates to a motor vehicle, and particularly pertains to a traction attachment for the running gear thereof.

It has been found in the performance of motor vehicles of the round wheel type that they are very often required to travel roadways upon which the tractive effort produced by the vehicle wheels is insufficient to propel the vehicle and this results in a breakdown or disastrous results to the running gear and power plant. It is the principal object of the present invention to provide a traction attachment for the driving wheels of motor vehicles, which attachment will furnish considerable additional traction surface and will at the same time grip the ground in a manner to prevent skidding and to deliver a maximum driving effort for the propulsion of the vehicle.

The present invention contemplates the use of articulated chain track treads which are normally carried in a convenient manner within storage boxes and which may be easily applied to the circumferences of the vehicle driving wheels in a manner to rotate therewith and positively engage the roadway; the structure being further fitted with means acting in combination with the vehicle wheels to maintain the chain tracks under a constant predetermined tension irrespective of the movement of the wheel.

The invention is illustrated by way of example in the accompanying drawings, in which—

Fig. 1 is a view in side elevation illustrating the present invention as applied to a motor vehicle.

Fig. 2 is an enlarged view in central, vertical section through the chain support and tensioning members.

Fig. 3 is an enlarged fragmentary view in section and elevation through the tensioning mechanism as seen on the line 3—3 of Fig. 4.

Fig. 4 is a view in vertical section through the tensioning mechanism as seen on the line 4—4 of Fig. 3.

Fig. 5 is an enlarged fragmentary view in side elevation showing the relation between the chain support drums and the vehicle wheel.

Fig. 6 is a view in horizontal section and elevation as seen on the line 6—6 of Fig. 5 showing the relation between the tensioning members and the wheel and the supporting position of the chain disks.

Fig. 7 is a view in horizontal section through one of the tensioning drums.

Fig. 8 is a view in vertical section through one of the tensioning drums.

Figs. 9 and 10 are views in elevation showing the formation of the chain disk shaft and brackets.

Fig. 11 is an enlarged fragmentary view of the ball race employed in the chain disk.

Fig. 12 is an enlarged view in horizontal section and elevation showing the chain tightening and support apparatus, with sheet metal chain wheels.

Fig. 13 is a view in section and elevation as seen on the line 13—13 of Fig. 12, showing the ball race and the adjustment for the tensioning drum.

Fig. 14 is a view in detail as seen on the line 14—14 of Fig. 12.

Fig. 15 is an enlarged fragmentary view in horizontal section.

Referring more particularly to the drawings, 10 indicates a vehicle main frame under the forward end of which a front axle structure 11 is mounted. The rear end of the frame is supported by a rear axle structure 12 having traction wheels 13. The traction wheels may be chain driven, if desired, or driven by their own axle. In any event the present invention will operate successfully.

Carried upon the rear of the main frame are boxes 14 within which a traction chain 15 may be packed. This chain is indicated in Fig. 1 as being rolled within the box to form a coil 16. The chain as unrolled is also indicated in this figure as circumscribing the wheel 13 and chain disks 17. Referring particularly to Figs. 5 and 6, it will be seen that the chain is formed with a plurality of hinged links 18 upon which outwardly extending ribs 19 are made. The separate links are connected by pins 20, and in longitudinal section are preferably made as shown in Fig. 6. In this view it will be seen that a tread plate 21 is provided having opposite flanged ends 22. The rib 19 extends longitudinally of this plate and is further reinforced by a plurality of transversely extending ribs 23.

The disks 17 over which the chain is intended to pass are free to rotate upon an axle 24. This axle is stationary and is supported between hanger arms 25 and 26 by means of bolts 27 and 28, as clearly shown in Fig. 2. The ends of the axle are formed with a plurality of radial serrations 29, as indicated in Fig. 9. These members provide seats for the protruding lugs 30 carried upon lock plates 31. The plates are interposed between the ends of the axle and the arms 25 and 26 and are there held by bolts 32 passing through openings 33 in the plates. In the present instance three chain disks are shown as held in equal spaced relation to each other along the axle. Interposed between these disks are tension drums 34 and 35. Each of these drums is formed with an outer ring member 36 having an annular raceway 37 around the inner circumference thereof. Bearing balls 38 are adapted to be seated against said raceway and to be held in position by a complementary raceway 39 formed as a part of an inner bearing ring 40.

The bearing ring 40 circumscribes the axle 24 but is not fixed in relation thereto as it is adjustably mounted upon a tension shaft 41. These shafts are shown in Fig. 2 as extending transversely through openings 42 in the axle 24. A gear case 43 circumscribes the axle and one of them is disposed between the two pairs of chain disks 17. In this position they are secured against rotation by keys 43' and hold the chain disks against longitudinal movement by means of set screw 43''.

As shown in Figs. 3 and 4 a portion of the shaft 41 is threaded to receive a worm gear 44 having a central threaded bore through which the shaft extends. This gear is in constant mesh with an adjusting worm 45 provided with a central squared opening 46 into which a key may be placed to rotate the gear and in turn move the shaft 41 longitudinally. The opposite ends of the shaft 41 are rotatably held by the ring member 40, as shown in Fig. 7, one end of the shaft being provided with a stop shoulder 47 and the other being held by a stirrup 48, thus making it possible to readily remove the ring, when desired, and also insuring that longitudinal movement of the shaft will produce like movement of the drum to give it any desired eccentricity in relation to its axle.

The foregoing description applies also to the construction shown in Figs. 12–15 which is substantially identical with the construction previously described and differs therefrom only in that the track disks 17 are made in two pieces, the disk proper and pressed-in hub 17$^b$, while in Fig. 2 the track disks 17 are cast with integral hubs 17$^a$.

Figs. 12–15 show more distinctly the means for adjusting the tensioning idler and the support for the inner race 39 thereof. The principal support of the latter is the tension shaft 41, one end of which is journaled in the bore 47 and the other end of which is clamped to the web 40 by the U-shaped stirrup 48. The third point of support for race 39 is defined by a lug 58 on the worm gear case 43 and a clamp including a bolt 59 for connecting the lug 58 to the internal rib 40 of the race 39. This prevents rotation of the tensioning idler bearing assembly about the tension shaft 41.

In operation of the present invention the arms 25 and 26 carrying chain disks 17 and drums 34 and 35 are supported in the position indicated in dotted lines in Fig. 1. For this purpose stirrups 49 are pivotally mounted upon the main frame and may be caused to engage the free ends of the swinging members 25 and 26. When the structure is thus supported the chains 16 are coiled within the storage boxes 14. In the event that the round wheels 13 fail to produce sufficient tractive effort for the propulsion of the vehicle the chains 16 may be mounted, as shown in Fig. 1 and thereafter tightened. This tightening is produced by inserting a key through web openings 17' and into the squared opening of the worm sleeve 45, thus producing rotation of the gear 44. This rotation will move the shaft 41 longitudinally and will force the outer periphery of the ring 36 against the tread surface of the wheel 13. By proper rotation of the tensioning mechanism any desired pressure may be exerted between the drums 34 and 35 and the wheels and the chain track thus tightened. While traveling in a roadway deflection of the vehicle springs 51 will not interfere with the tension of the chain as the swinging arms 25 and 26 are pivotally supported upon a shaft 52 carried on the main frame which will permit any desired radial action for the movement of the chain disks and tensioning mechanism as effected by displacement of the vehicle axle. A shield member 60 is provided to protect the upper portion of the ball race 36—39 against entry of mud and dirt.

It will thus be seen that the device here disclosed while decidedly simple in its construction and commercially desirable, at the same time produces means easily applied to a vehicle of the round wheel type so that additional tractive effort may be obtained when desired and further insuring that the traction chain may remain in a constant predetermined tension.

While I have shown the preferred form of my invention as now known to me I wish it understood that various changes may be made by those skilled in the art without departing from the spirit of the invention as disclosed in the appended claims.

Having thus described my invention, what I claim and desire to secure by Letters Patent is:

1. The combination with a traction wheel of a vehicle, of an endless tread, an idler member co-operating with the wheel to maintain the tread in operative position on the latter, means for supporting the idler from the vehicle and means revolubly mounted upon said supporting means, having rolling contact with a portion of the wheel.

2. The combination with a traction wheel of a vehicle, of an endless tread, an idler member co-operating with the wheel to maintain the tread in operative position on the latter, means for supporting the idler from the vehicle and means revolubly mounted upon said supporting part and having rolling contact with the peripheral surface of the wheel.

3. The combination with a traction wheel of a vehicle, of an endless tread, an idler member co-operating with the wheel to maintain the tread in operative position on the latter, means for supporting the idler from the vehicle, means revolubly mounted upon said supporting means, having rolling contact with a portion of the wheel, and means on the said support for shifting the axis of rotation of the revolubly mounted means radially toward or away from the axis of the idler.

4. The combination with a traction wheel of a vehicle, of an endless tread, an idler member co-operating with the wheel to maintain the tread in operative position upon the latter, means connected to the vehicle and free to swing in planes parallel to the line of traction for supporting the idler and a brace between the idler and the wheel, including a roller-like body revolubly mounted upon the idler-supporting means and having rolling contact with a portion of the wheel.

5. Arrangement according to claim 4 including means for shifting the axis of rotation of the roller-like body radially toward or away from the axis of the idler.

6. An endless tread attachment for vehicles of the round wheel type comprising an endless tread to fit around the traction wheel of the vehicle, an idler member over which the endless tread passes, said idler member being supported upon the main frame of the vehicle, and tensioning means between the idler member and the traction wheel, said tensioning means bearing against the support for the idler and engaging with a movable portion of the traction wheel.

7. In combination with a vehicle main frame and its traction wheels of swinging hangers carried upon the main frame. sprocket disks rotatably supported on the free end of said hangers and normally held in an inoperative position, tension drums carried by said hangers, traction chains circumscribing the vehicle wheels and disks and means whereby the tension drums may be forced against the circumference of the tires of the vehicle wheels to establish and maintain a desired tension of the traction chains.

8. A chain track traction attachment for vehicles of the round wheel type comprising in combination an endless chain track, front and rear wheel members around which the track passes and tensioning means between the wheel members having rolling contact with one wheel member and rotating about the axis of the other wheel member.

9. A chain track traction attachment for vehicles comprising in combination an endless chain track, a pair of wheels around which the track is adapted to pass, one of the wheels having an eccentrically arranged tensioning member in rolling contact with the other wheel.

10. A traction attachment for vehicles of the round wheel type consisting in the combination with a vehicle wheel of a chain track embracing the wheel and a guide pulley around which the track passes, said guide pulley having a tensioning member in rolling contact with the periphery of said vehicle wheel, the tensioning member being carried by the axle of the pulley.

11. A traction attachment for vehicles consisting in the combination with a vehicle wheel of an endless chain track embracing the wheel, a pulley around which said track passes, a tensioning member carried by the axle of the pulley and held in rolling contact with the periphery of the vehicle wheel and tensioning means for adjustably disposing said tensioning member eccentrically of the pulley axis.

12. A guide pulley divided circumferentially in planes at right angles to the axis of the pulley, the portions of the pulley being independently rotatable and means by which one portion is adjustable eccentrically with reference to the other.

13. In a device of the character described, a pair of pulleys, an axle around which said pulleys may rotate and means for adjustably disposing one pulley eccentrically of the axle.

14. In a device of the character described, a fixed axle, a pulley free to rotate around said axle, a tensioning drum circumscribing the axle, means carried by the axle for supporting and permitting rotation of said drum around the axle and means incorporated therein for disposing said drum eccentrically of the axle.

15. In a device of the character described, a fixed axle, a shaft extending through the axle and adapted to be slidably moved, a ball race supported upon the opposite ends of the shaft and circumscribing the axle, a tire member circumscribing said ball race, a plurality of bearing balls disposed between said members and gear means for moving the shaft whereby the ball race and tire will be disposed eccentrically of the axle.

16. An endless tread attachment for vehicles of the round wheel type comprising in combination an endless tread to fit over the traction wheel of the vehicle, an idler wheel over which the tread operates, said idler wheel being mounted on the main frame of the vehicle, and tensioning means between the idler member and the traction wheel having rolling contact with one wheel member and rotating about the axis of the other wheel member.

In testimony whereof I have hereunto set my hand in the presence of two subscribing witnesses.

CHARLES F. BALL.

Witnesses:
O. D. MORGAN,
ADOLPH W. SZOLD.